United States Patent
Suzuki et al.

(10) Patent No.: US 11,478,887 B2
(45) Date of Patent: Oct. 25, 2022

(54) SCREW TIGHTENING APPARATUS AND SCREW TIGHTENING METHOD

(71) Applicant: Konica Minolta, Inc., Tokyo (JP)

(72) Inventors: Daichi Suzuki, Toyokawa (JP);
Kiyohito Tsujihara, Toyokawa (JP);
Shogo Asaoka, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 31 days.

(21) Appl. No.: 17/228,035

(22) Filed: Apr. 12, 2021

(65) Prior Publication Data
US 2021/0370450 A1    Dec. 2, 2021

(30) Foreign Application Priority Data
May 27, 2020    (JP) .............................. JP2020-092246

(51) Int. Cl.
*B23P 19/10*    (2006.01)
*B23P 19/06*    (2006.01)
*G01B 3/22*    (2006.01)
*G01B 5/14*    (2006.01)

(52) U.S. Cl.
CPC ............... *B23P 19/10* (2013.01); *B23P 19/06* (2013.01); *G01B 3/22* (2013.01); *G01B 5/14* (2013.01)

(58) Field of Classification Search
CPC . B23P 19/10; B23P 19/06; G01B 3/22; G01B 5/14
See application file for complete search history.

(56) References Cited

U.S. PATENT DOCUMENTS

| 4,418,765 | A | * | 12/1983 | Mori | B25B 23/14 81/470 |
|---|---|---|---|---|---|
| 4,551,097 | A | * | 11/1985 | Lazarus | A61C 3/00 433/39 |
| 4,620,450 | A | * | 11/1986 | Yamaguchi | B25B 23/14 73/761 |
| 5,288,191 | A | * | 2/1994 | Ruckert | F16B 5/0233 411/432 |
| 5,469,924 | A | * | 11/1995 | Kanamori | B25B 23/14 173/176 |
| 5,549,169 | A | * | 8/1996 | Matsumura | B23P 19/06 173/176 |
| 5,715,894 | A | * | 2/1998 | Maruyama | B25B 23/1456 173/180 |

FOREIGN PATENT DOCUMENTS

| JP | 6-64573 A | 3/1994 |
|---|---|---|
| JP | 06064573 A | * 3/1994 |

* cited by examiner

*Primary Examiner* — Bayan Salone
(74) *Attorney, Agent, or Firm* — Rankin, Hill & Clark LLP

(57) ABSTRACT

There is provided a screw tightening apparatus that fastens, with a screw, two objects to be fastened including a first member provided with a first screw hole and a second member provided with a second screw hole for screwing, and the screw tightening apparatus includes: a distance measuring device that measures a relative position between the first member and the second member in a vertical direction perpendicular to the axial direction of the second screw hole; a screw tightening part that holds the screw inserted into the first screw hole and screws the screw into the second screw hole for screwing; a moving mechanism that moves the screw tightening part along the vertical direction; and a hardware processor that controls the screw tightening part and the moving mechanism according to a measured value of the distance measuring device.

14 Claims, 7 Drawing Sheets

SCREW TIGHTENING APPARATUS AND SCREW TIGHTENING METHOD

The entire disclosure of Japanese patent Application No. 2020-092246, filed on May 27, 2020, is incorporated herein by reference in its entirety.

BACKGROUND

Technological Field

The present invention relates to a screw tightening apparatus and a screw tightening method.

Description of the Related Art

When screwing together two members, it is necessary to align them in a temporarily tightened state, and then perform work by assuming the actual usage situation (JP 6-4573 A). JP 6-64573 A discloses an automobile door assembly method in which a door glass is mounted on a door panel of a vehicle body door. In this assembly method, the door glass is temporarily tightened and fixed to the door panel with screws on a horizontal surface plate, and then the surface plate is tilted 90 degrees to bring the vehicle body door on the surface plate into the actual upright state. Then, the position of the door glass is measured in the upright state, and this position is compared with door glass reference position data to calculate a position correction amount of the door glass. Then, the surface plate is returned to the horizontal state, the position of the door glass is corrected by the calculated position correction amount, and then the door glass is finally tightened and fixed to the door panel.

However, even if the members are aligned after the temporary tightening, when tightening the screws by screwing in the process leading to the subsequent final tightening, frictional force generated on a surface where the plate of the screw and the member to be fastened come into contact may cause misalignment of the members.

The assembly method of JP 6-64573 A cannot correct the misalignment that occurs in the process leading to the final tightening, and there is a possibility that mounting cannot be performed with high precision.

SUMMARY

The present invention has been made in view of the above circumstances, and aims to provide a screw tightening apparatus and a screw tightening method that enable screw tightening and fastening of two objects to be fastened while the objects are aligned with high precision.

To achieve the abovementioned object, according to an aspect of the present invention, there is provided a screw tightening apparatus that fastens, with a screw, two objects to be fastened including a first member provided with a first screw hole and a second member provided with a second screw hole for screwing, and the screw tightening apparatus reflecting one aspect of the present invention comprises: a distance measuring device that measures a relative position between the first member and the second member in a vertical direction perpendicular to the axial direction of the second screw hole; a screw tightening part that holds the screw inserted into the first screw hole and screws the screw into the second screw hole for screwing; a moving mechanism that moves the screw tightening part along the vertical direction; and a hardware processor that controls the screw tightening part and the moving mechanism according to a measured value of the distance measuring device, wherein the hardware processor brings the first and second members to a temporarily tightened state by screwing the screw into the second screw hole by the screw tightening part, and moves the screw tightening part holding the screw in the vertical direction by the moving mechanism to temporarily adjust the position of the second member relative to the first member to bring the position close to a median within a target range, further tightens the screw by the screw tightening part while measuring the relative position between the first member and the second member by the distance measuring device, and loosens the screw by the screw tightening part when the relative position goes out of the target range, and moves the screw tightening part by the moving mechanism by a predetermined adjustment amount in an adjustment direction determined on the basis of a measured value of the distance measuring device when the relative position goes out of the target range, and then tightens the screw again.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
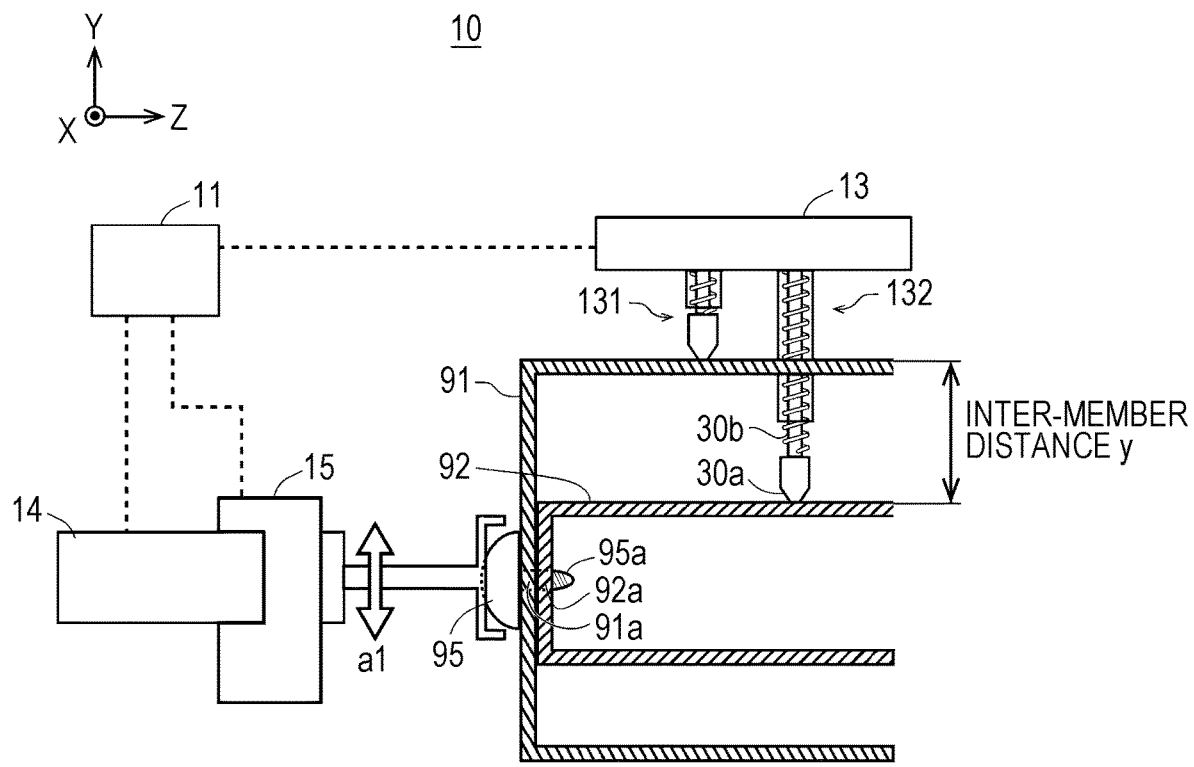
FIG. 1 is a schematic view showing the overall configuration of a screw tightening apparatus according to the present embodiment.

Hereinafter, one or more embodiments of the present invention will be described with reference to the drawings. However, the scope of the invention is not limited to the disclosed embodiments. Note that in the description of the drawings, the same elements are designated by the same reference numerals, and duplicate description will be omitted. Additionally, the dimensional ratios in the drawings are exaggerated for convenience of explanation and may differ from the actual ratios.

Figure 2:
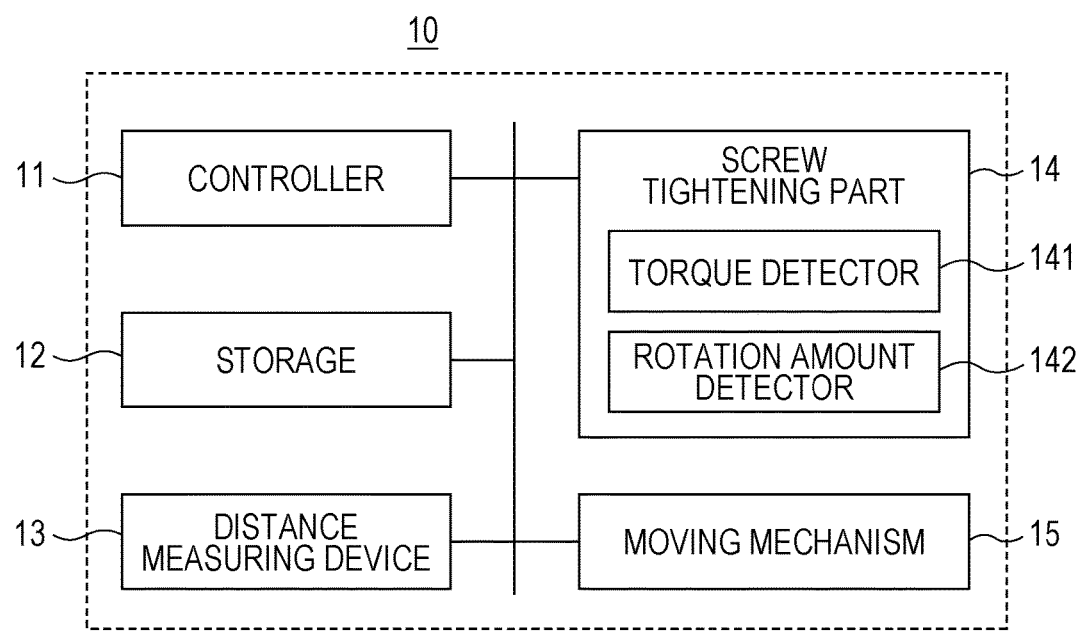
FIG. 2 is a block diagram of the screw tightening apparatus.

FIG. 1 is a schematic view showing the overall configuration of a screw tightening apparatus 10 according to the present embodiment. FIG. 2 is a block diagram of the screw tightening apparatus 10.

As shown in FIGS. 1 and 2, the screw tightening apparatus 10 has a controller 11, a storage 12, a distance measuring device 13, a screw tightening part 14, and a moving mechanism 15. The screw tightening apparatus 10 fixes a first member 91 and a second member 92 as two objects to be fastened, with a screw 95. One of the first member 91 and the second member 92, such as the first member 91 is fixed by a fixedly holding part (not shown) such as a surface plate at the time of fastening, for example. Additionally, the distance measuring device 13 is also supported by the same fixedly holding part. The screw tightening apparatus 10 fastens the first member 91 and the second member 92 with the screw 95 so that the members are in a predetermined relative positional relationship. Specifically, the screw tightening apparatus 10 adjusts the position so that the second member 92 is in the predetermined positional relationship with the fixedly supported first member 91, and then fixes and fastens the members with the screw 95. Along first screw hole 91*a* is provided in the first member 91, and a second screw hole 92*a* (thread cutting groove) for screwing as a female screw is provided in the second member 92. The screw 95 is a countersunk head screw or a pan head screw, for example, and grooves for a Phillips screwdriver are formed in the head.

The axial direction (screw tightening direction) of the second screw hole 92*a* and a screw portion 95*a* of the screw 95 is the Z direction. A plane perpendicular to the Z direction is the XY plane. The following description will be given on the assumption that the Y direction coincides with the major axis direction of the first screw hole 91*a*, which is a long hole, the second member 92 and the screw 95 are movable in the Y direction by the moving mechanism 15, and the distance measuring device 13 measures the positions of the first and second members 91 and 92 in the same Y direction. However, the major axis direction, the movable direction, and the measurement direction of the distance measuring device 13 are not limited to the Y direction, and may be any direction extending along the XY plane. Note that in the following, the Y direction is also referred to as a height direction, and a position in the Y direction is also referred to as a height position.

(Controller 11)

The controller 11 includes a CPU and the like, performs various processing by executing various programs stored in the storage 12 described later, and controls each unit of the apparatus and performs various arithmetic processing according to the programs. The controller 11 controls the distance measuring device 13, the screw tightening part 14, and the moving mechanism 15.

(Storage 12)

The storage 12 includes a ROM for storing various programs and various data in advance, a RAM for temporarily storing programs and data as a work area, and an auxiliary storage such as a hard disk for storing various programs and various data. Additionally, the storage 12 temporarily stores the final tightening amount detected by a final tightening detector (see Modification 3 described later).

(Distance Measuring Device 13)

The distance measuring device 13 measures the height position (position in Y direction) of each of the first member 91 and the second member 92. The distance measuring device 13 includes multiple measuring terminals 131 and 132. Each of the measuring terminals 131 and 132 is a spindle type dial gauge, for example. A spindle 30*b* is energized in the (negative) Y direction by a spring or the like, and a gauge head 30*a* is brought into contact with each member (members 91 and 92) to be measured to measure the height position of each member. The distance measuring device 13 outputs the measured value from each of the measuring terminals 131 and 132. Upon receipt of these measured values, the controller 11 determines an inter-member distance y which is the relative position between the two members (inter-member distance in height direction which is relative position between two members). Note that as the distance measuring device 13, a non-contact type sensor using a laser beam or the like may be used instead of the contact type sensor.

(Screw Tightening Part 14)

The screw tightening part 14 holds the screw 95 and tightens the screw by screwing the screw 95 into the screw hole. The screw tightening part 14 is an electric screwdriver, for example, and tightens the screw 95 that is a pan head screw or a countersunk head screw. Additionally, the screw tightening part 14 has the functions of a torque detector 141 and a rotation amount detector 142. The torque detector 141 detects the rotation torque of the screw tightening part 14, and the rotation amount detector 142 detects the rotation amount (angle, rotation speed) of the screw tightening part 14.

(Moving Mechanism 15)

The moving mechanism 15 holds the screw tightening part 14 and moves it in three dimensions in the X, Y. and Z directions. In the present embodiment, the controller 11 controls the moving mechanism 15 to move the screw tightening part 14 in the XY plane perpendicular to the second screw hole 92*a*. Specifically, the controller 11 moves the screw tightening part 14 up and down in the Y direction (arrow al direction in FIG. 1) along the major axis direction of the long hole (first screw hole 91*a*) of the first member 91 on the basis of the measured values of the distance measuring device 13, to adjust the height positions of the screw 95 and the second member 92 so that the inter-member distance y of the two members (members 91 and 92) fall within a predetermined target range (target precision). Here, the target range is a range between threshold values yH and yL at the time of adjustment (see FIGS. 4 and 5 described later). The threshold values yH and yL are control values used for performing a determination in screw tightening processing, and when the threshold values yH and yL are exceeded, the position is readjusted in the following screw tightening processing. Additionally, the target range also corresponds to a range between the upper tolerance limit and the lower tolerance limit (see FIG. 4 described later).

(Screw Tightening Processing of First Embodiment)

Figure 3:
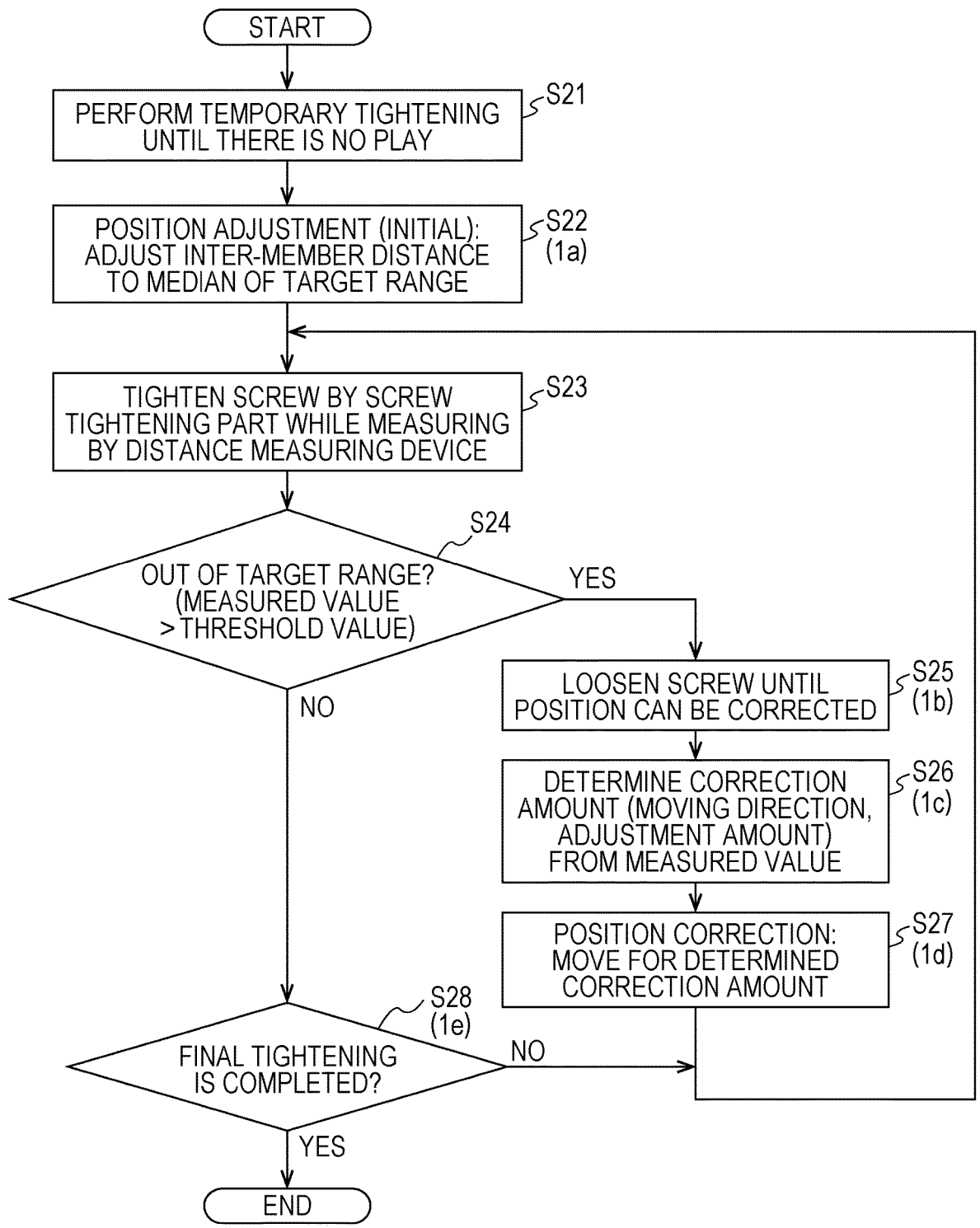
FIG. 3 is a flowchart showing screw tightening processing performed by the screw tightening apparatus according to a first embodiment.
Figure 4:
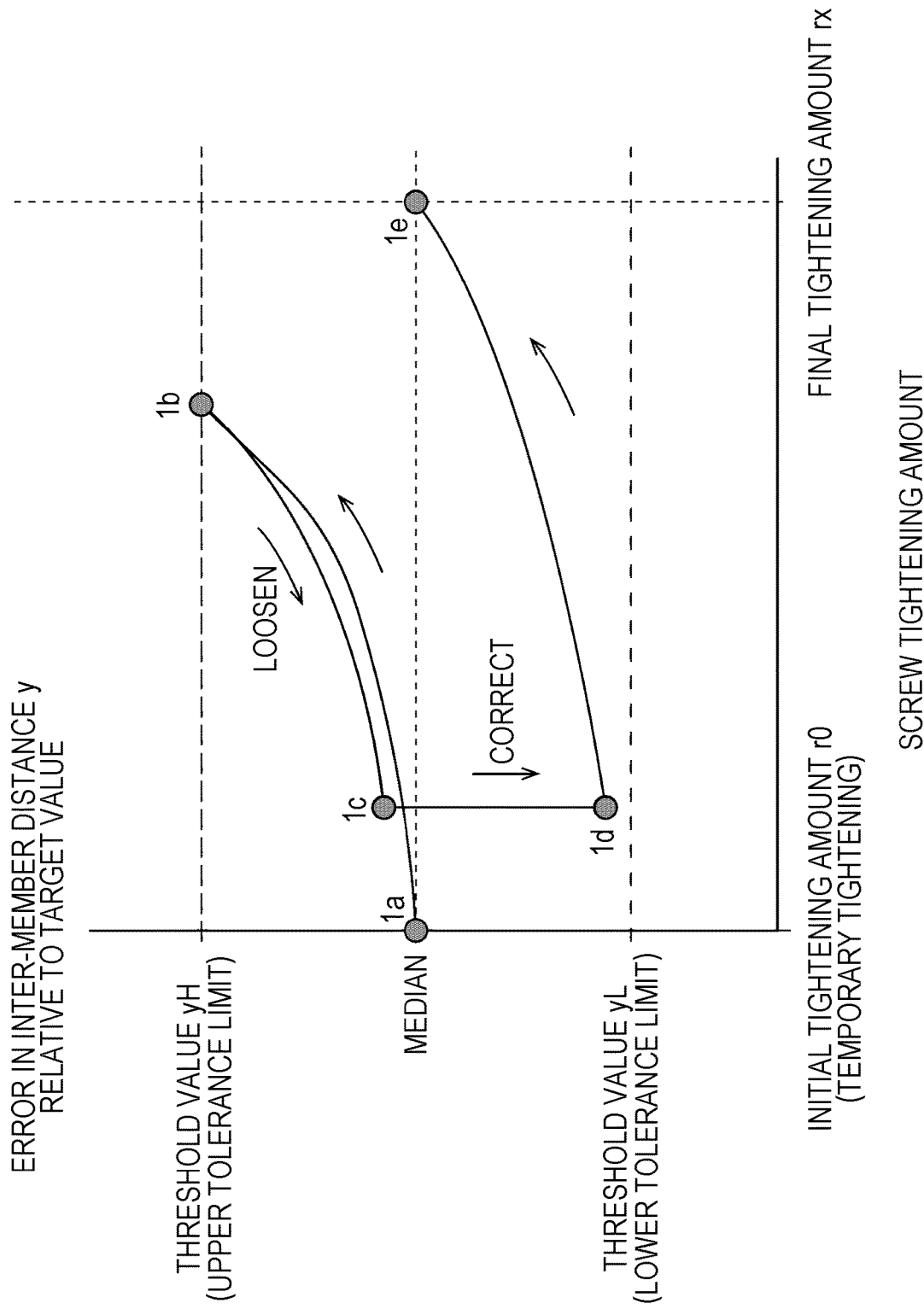
FIG. 4 is a diagram showing the transition of a target range of the relative position and a screw tightening amount in the screw tightening processing of FIG. 3.

FIG. 3 is a flowchart showing screw tightening processing performed by the screw tightening apparatus 10. FIG. 4 is a diagram showing the transition of a target range of the inter-member distance and the screw tightening amount in the screw tightening processing of FIG. 3.

In FIG. 4, the horizontal axis represents the screw tightening amount, and the vertical axis represents the inter-member distance y of the two members (see FIG. 1). The screw tightening amount on the horizontal axis is the rotation amount (output of rotation amount detector 142) applied to the screw 95 by the screw tightening part 14, and indicates the range from a tightening amount r0 at the time of temporary tightening to a tightening amount rx at the time of final tightening. Note that instead of the rotation amount, the tightening torque (output of torque detector 141) may be used as the screw tightening amount. In this case, the tightening amount rx at the time of final tightening is the tightening torque set by design.

On the vertical axis, the threshold value yH corresponds to the upper tolerance limit, and the threshold value yL corresponds to the lower tolerance limit. The target range is between the threshold values yH and yL, and the screw tightening apparatus 10 tightens the screw so that the inter-member distance y falls within this range (the same applies to FIGS. 5 to 7 described later). Additionally, target range≤tolerance range. In the screw tightening processing of the present embodiment described below, when the inter-member distance y goes out of the target range, that is, exceeds the threshold value yH or the threshold value yL, the position is readjusted according to a determined correction amount, and the screw is tightened again.

(Step S21)

As shown in FIG. 3, here, the controller 11 controls the screw tightening part 14 (and moving mechanism 15) to fasten (join) the first member 91 and the second member 92, which are two objects to be fastened, by the screw 95. The screw 95 is automatically tightened by the screw tightening part 14. The tightening amount of the screw 95 is set in advance so as to have a predetermined torque. This is a temporarily tightened state where there is no play between the two members.

(Step S22)

The controller 11 controls the moving mechanism 15 while monitoring the measured values of the distance measuring device 13, to adjust the inter-member distance y so that it comes close to the median of the target range. Here, close to the median is, for example, within an error range of several percent to ten and several percent of the median when the target range width (=upper tolerance limit−lower tolerance limit) is 100%. This state corresponds to "state $1a$" in FIG. 4, which is a temporarily tightened state and a state after (temporary) correction.

(Step S23)

The controller 11 tightens the screw by the screw tightening part 14 while monitoring the measured values of the distance measuring device 13.

(Step S24)

When the inter-member distance y calculated from the measured values goes out of the target range, that is, exceeds the threshold value (inter-member distance y>threshold value yH, or inter-member distance y<threshold value yL) (YES), the processing of the controller 11 proceeds to step S25. This state corresponds to "state $1b$" in FIG. 4. On the other hand, if the inter-member distance y does not exceed the threshold value (NO), the processing proceeds to step S28.

(Step S25)

The controller 11 loosens the screw 95 by the screw tightening part 14 until the misalignment can be corrected. This state corresponds to "state $1c$" in FIG. 4. The loosening amount may be (1) returned to the initial tightening amount r0 (see FIG. 4) at the time of temporary tightening. (2) returned for a preset rotation amount according to the output of the rotation amount detector 142, or (3) returned to a predetermined torque depending on the output of the torque detector 141.

(Step S26)

The controller 11 determines the adjustment direction according to the sign of the measured value when the inter-member distance y goes out of the target range ($1b$ in FIG. 4), that is, whether the inter-member distance y exceeds the upper limit value or the lower limit value. In $1b$ of FIG. 4, since the inter-member distance y exceeds the upper tolerance limit, the direction opposite to this direction is set as the adjustment direction. That is, in the example of FIG. 4, the direction in which the screw 95 and the second member 92 are lifted (positive Y direction) is determined as the adjustment direction, so that the inter-member distance y is reduced.

As the adjustment amount (movement amount), a preset fixed value such as a fixed value corresponding to 50% or 25% of the target range width may be used (FIG. 4 is an example using a fixed value of 50% of the target range width). Alternatively, the adjustment amount may be determined according to the tightening amount when the threshold value is exceeded (e.g., Modification 2 (FIG. 6) described later).

(Step S27)

Here, the controller 11 uses the moving mechanism 15 to correct the position with the correction amount (adjustment direction, adjustment amount) determined in step S26. This state corresponds to "state $1d$" in FIG. 4. After the position is corrected in step S27, the processing is returned to step S23, and the subsequent processing is repeated.

(Step S28)

If the screw has not been finally tightened and is being tightening before the final tightening (NO), the processing of the controller 11 returns to step S23. On the other hand, if the controller 11 detects that it the screw has been finally tightened (YES), the controller 11 ends the screw tightening processing (end). This state corresponds to "state $1e$" in FIG. 4. It may be determined that the screw has been finally tightened by the output of the torque detector 141 of the screw tightening part 14 reaching a preset specified torque, or by the output of the rotation amount detector 142 indicating that the rotation amount of the screw 95 reaches a predetermined amount.

As described above, in the present embodiment, the screw tightening apparatus performs control such that the screw is further tightened by the screw tightening part while the relative position between the first member and the second member is measured by the distance measuring device, the screw is loosened by the screw tightening part when the relative position goes out of the target range, the screw tightening part is moved by the moving mechanism by a predetermined adjustment amount in the adjustment direction determined on the basis of the measured value when the relative position goes out of the target range, and then the screw is tightened again. As a result, it is possible to tighten the screw and fasten the first and second members, which are two objects to be fastened, while the objects are aligned with high precision.

(Modification 1)

Figure 5:
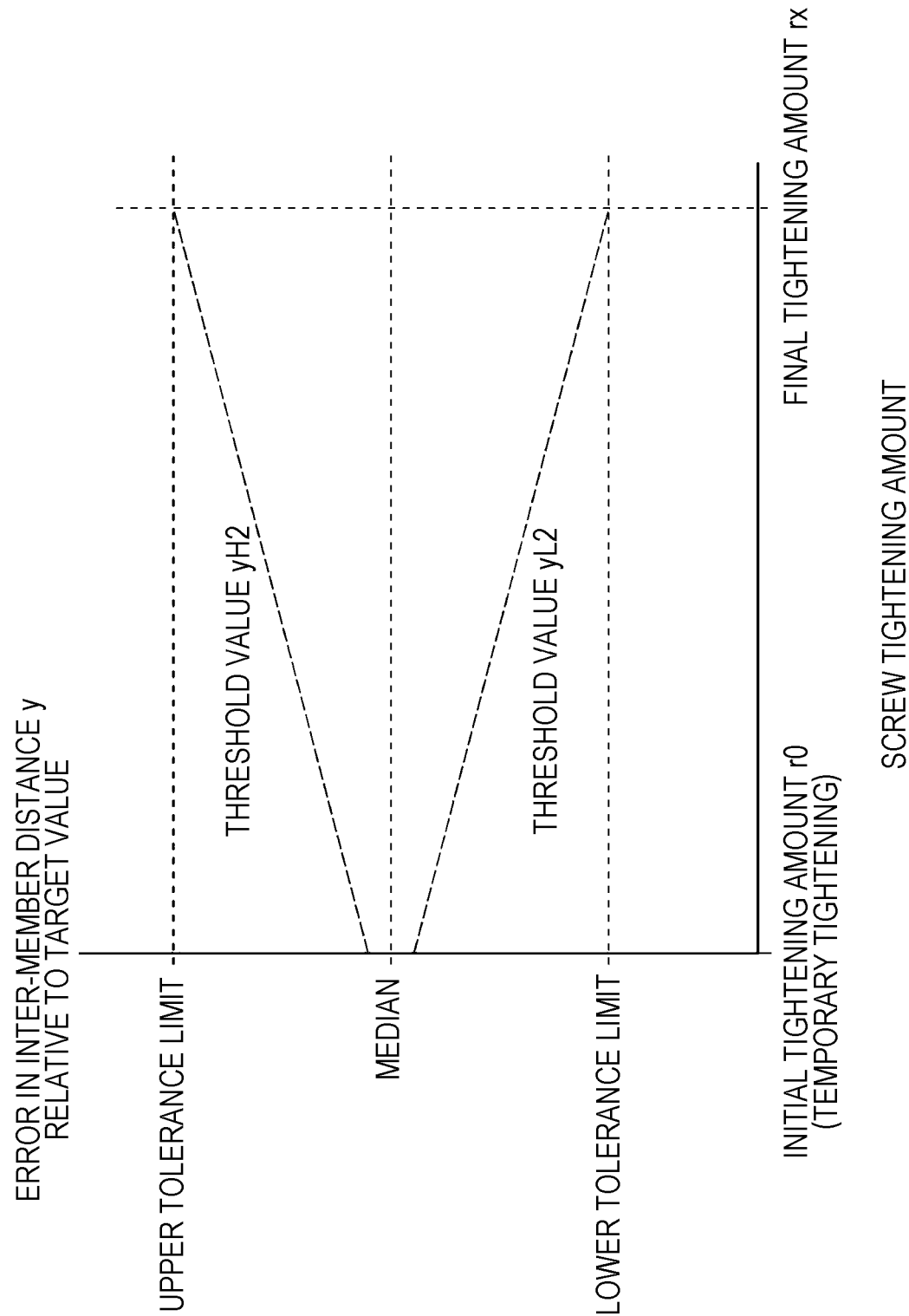
FIG. 5 is a diagram showing an example in which the upper and lower threshold values are changed according to the screw tightening amount in Modification 1.

In the example shown in FIG. 4 above, the target range in which the upper and lower limits are defined by the threshold values yH and yL is a fixed range that matches the range of the upper and lower tolerance limits. In Modification 1 shown in FIG. 5, the target range is changed according to the tightening amount of the screw. In Modification 1, the absolute values of thresholds yH2 and yL2 (absolute values of the difference from the median, the same applies hereinafter) are linearly increased at a constant rate as the screw tightening amount on the horizontal axis increases. In the example of FIG. 5, when the inter-member distance y exceeds the threshold value yH2 or yL2, since it is out of the target range, the screw is loosened and the position is corrected by the processing of steps S25 to S28 following the determination (YES) of step S24 in FIG. 3. Note that in this case, the adjustment amount (movement amount) at the time of position correction may be set according to the value of the threshold value yH2 (or threshold value yL2) when the inter-member distance y exceeds the target range. For example, the movement amount is increased as the absolute value of the threshold value yH2 increases.

As described above, in Modification 1, the position can be corrected an appropriate number of times by changing the threshold value according to the screw tightening amount. Specifically, the number of corrections can be appropriately increased as compared with a large threshold value, without excessively increasing the number of corrections as compared with a case where the threshold value is simply reduced.

(Modification 2)

Figure 6:
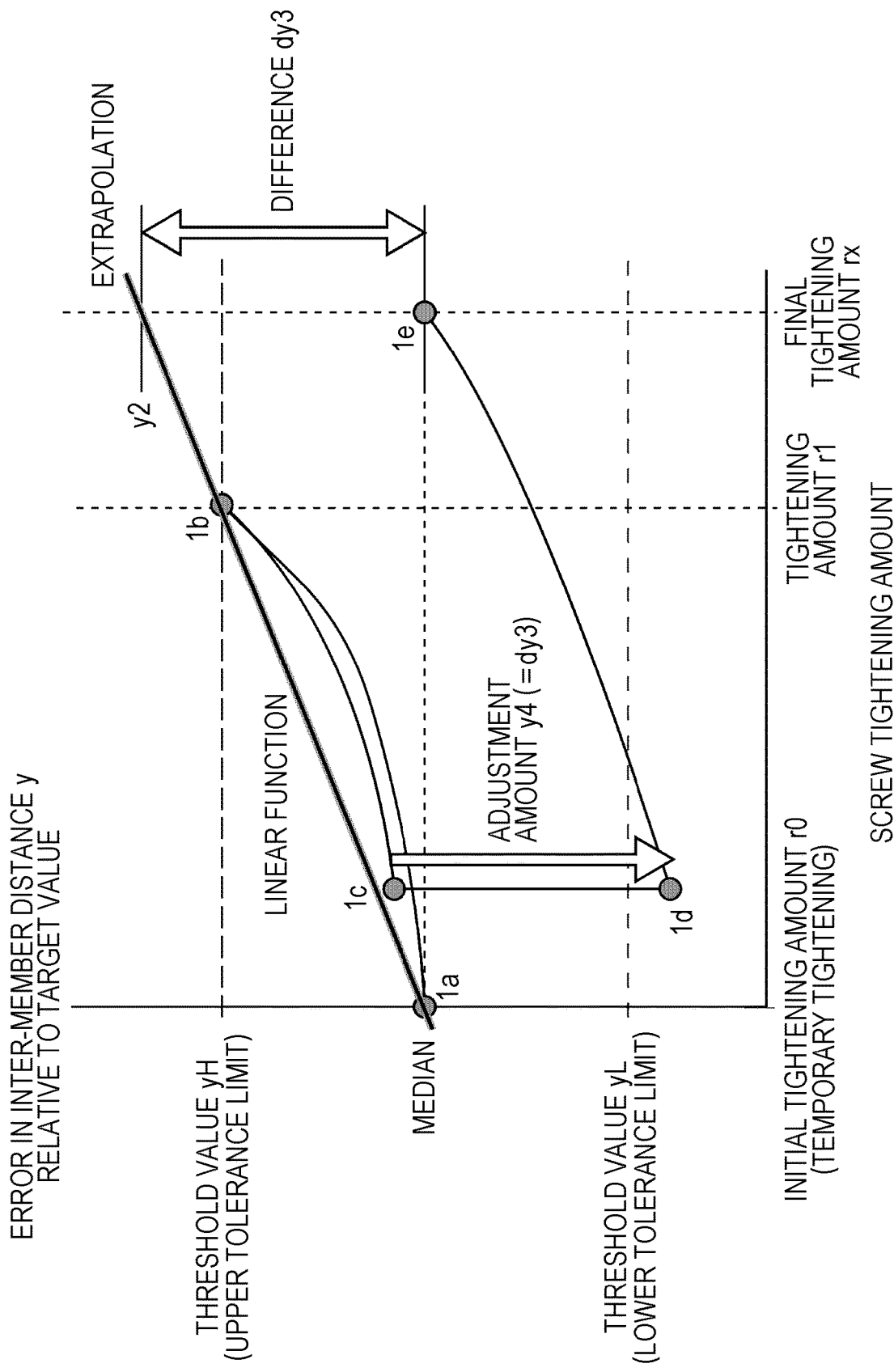
FIG. 6 is a diagram illustrating a procedure for obtaining an adjustment value by extrapolation in Modification 2.

While the adjustment amount is a predetermined fixed value in the first embodiment, the adjustment amount may be determined on the basis of the screw tightening amount and the measured value of the distance measuring device at the time of temporary adjustment, and the screw tightening amount and the measured value of the distance measuring device when the inter-member distance y goes out of the target range, as shown in FIG. 6. Specifically, the adjustment amount is determined on the basis of the screw tightening amount (initial tightening amount r0) and the measured value of the distance measuring device (close to median) at the time of temporary adjustment (state 1a) in FIG. 6, and the screw tightening amount (tightening amount r1) and the measured value of the distance measuring device (threshold value yH) when the inter-member distance y goes out of the target range (state 1b) in FIG. 6. In FIG. 6, by extending (extrapolating) the line (linear function) connecting the coordinates in the state 1a and the coordinates in the state 1b to the final tightening amount rx, an error y2 at that time is obtained. Then, a difference dy3 between the error y2 and the median is defined as an adjustment amount y4. This adjustment amount y4 is used as the correction amount for correcting the position from the state 1c to the state 1d (step S27). With this process, the correction amount for correcting the position once can be increased within a range that is not excessive, so that the number of corrections (number of times of processing of steps S25 to S27) can be reduced, and the total processing time can be shortened.

Note that as error avoidance processing, in the example of FIG. 6, the inter-member distance y has already exceeded the corresponding threshold value yL in the correction direction at the time of the state 1d immediately after the correction with the adjustment amount y4. That is, in the determination of step S24 (YES) in FIG. 3, the processing of S25 is immediately performed. In order to avoid this, for the convenience of control processing, the threshold value yL may be temporarily widened (moved downward), or the determination of whether or not the inter-member distance y has exceeded the threshold value yL corresponding to the correction direction may be skipped until a tightening amount r1 (or value obtained by adding constant value to tightening amount r1) is reached.

Additionally, when the adjustment amount is obtained by extrapolation, a quadratic function may be used instead of the linear function. Alternatively, when a linear function or a quadratic function is used, the difference dy3 may be calculated using the tightening amount in the state 1c (or state 1d) instead of the tightening amount t0.

(Modification 3)

Figure 7:
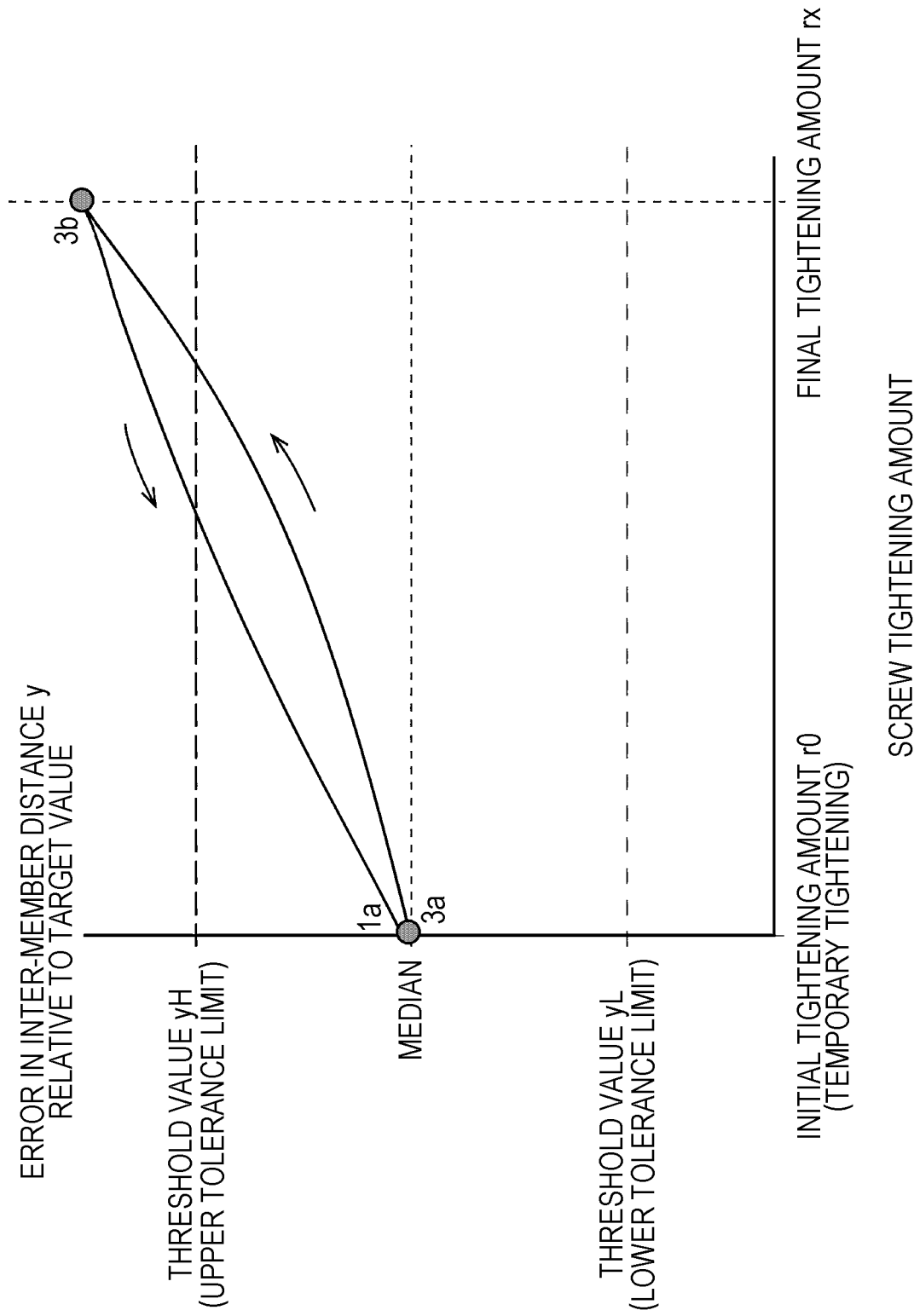
FIG. 7 is a diagram illustrating a procedure for obtaining a final tightening amount in Modification 3.

FIG. 7 is a diagram illustrating a procedure for obtaining the final tightening amount Modification 3. In Modification 3, a torque detector 141 and a rotation amount detector 142 cooperate with each other to function as a "final tightening detector". Specifically, as shown in FIG. 7, a screw 95 is tightened from a state 3a (temporarily tightened state similar to state 1a) until the output of the torque detector 141 reaches a specified torque (tightening torque) corresponding to the final tightening. This state corresponds to a state 3b in FIG. 7. A controller 11 stores the rotation amount from the rotation amount detector 142 at this time in a storage 12 as a final tightening amount rx. After that, the screw 95 is loosened once, and the position is adjusted so that a distance y between the two members comes close to the median to create the state 1a.

The fixed position at the time of final tightening varies depending on the shape of the member and variation in the length of the screw. As described above, in Modification 3, since the final tightening amount rx at the time of actual final tightening is measured, the final tightening amount rx can be determined accurately, and by extension, an adjustment amount y4 leading to a precise state 1e can be determined with high precision.

(Screw Tightening Processing of Second Embodiment)

Figure 8:
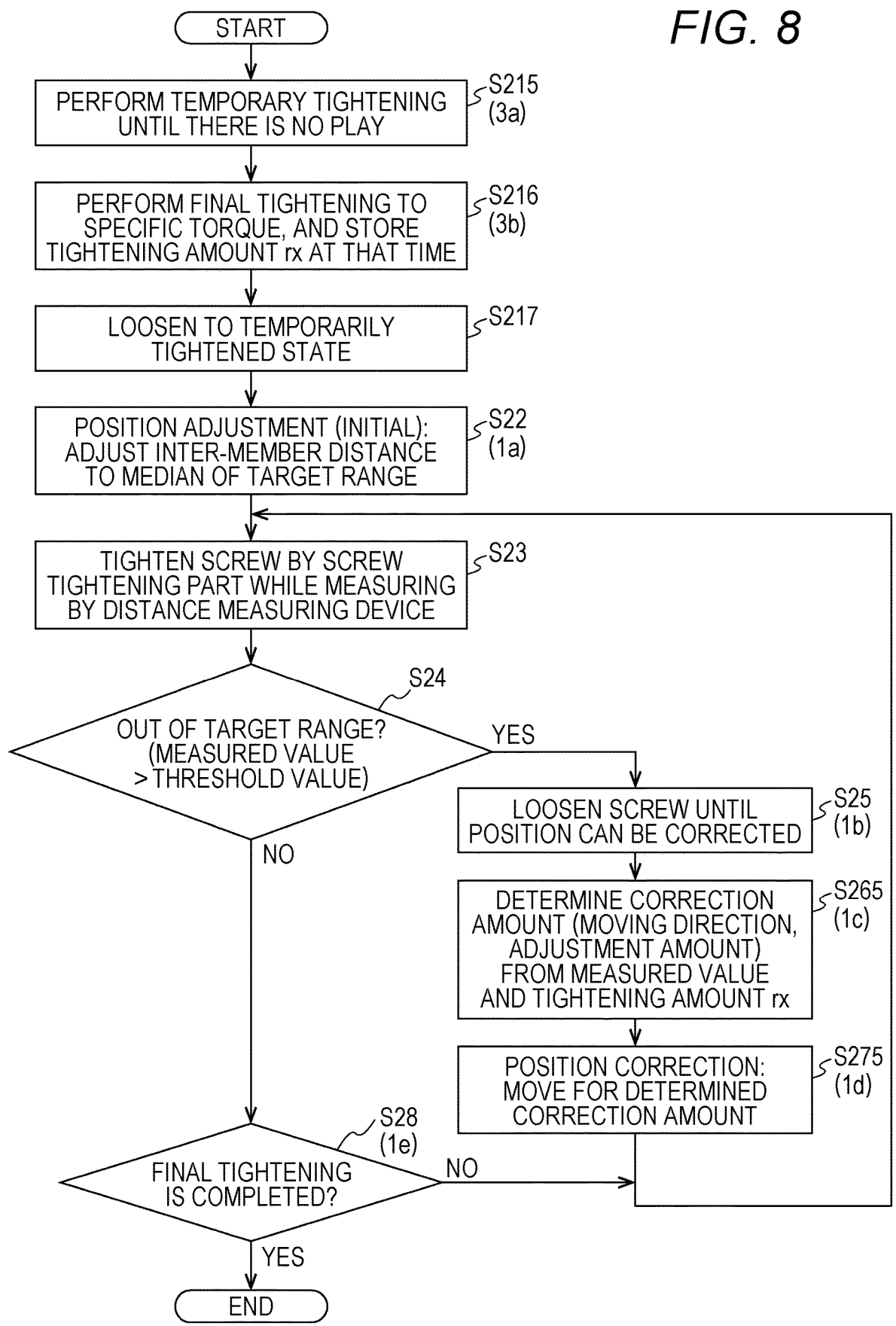
FIG. 8 is a flowchart showing screw tightening processing performed by the screw tightening apparatus according to a second embodiment.

FIG. 8 is a flowchart showing screw tightening processing performed by a screw tightening apparatus according to a second embodiment. In the processing of FIG. 8, the final tightening amount is obtained by the procedure of Modification 3 (FIG. 7), and, using the final tightening amount, the adjustment amount is determined by the procedure of Modification 2 (FIG. 6).

(Step S215)

Here, a controller 11 performs processing similar to that in step S21 shown in FIG. 3 to perform temporary tightening. In the temporarily tightened state, the two members (members 91 and 92) are screwed to the extent that there is no play, but the position can be adjusted. This state corresponds to the state 3a in FIG. 7.

(Step S216)

The controller 11 refers to the output of a torque detector 141 and controls a screw tightening part 14 to tighten a screw 95 to a specified torque to perform final tightening. A tightening amount rx corresponding to the output of a rotation amount detector 142 at this time is stored in a storage 12.

(Step S217)

From the state of step S216, loosen the screw 95 by a predetermined tightening amount to create a temporarily tightened state. A tightening amount r0 at this time is a value obtained by subtracting a predetermined rotation amount from the tightening amount rx.

(Steps S22 to S25)

The processing is the same as the processing with the same numbering described in FIG. 3, and the description thereof will be omitted.

(Step S265)

According to the processing shown in Modification 2 of FIG. 6, the controller 11 uses the tightening amount rx stored in step S216 and each value (tightening amount r0, r1, threshold value yH, median) to estimate an error y2 in the case of the final tightening amount rx by extrapolation, and thereby determines an adjustment amount y4. The adjustment direction is opposite to the sign (direction) of the error, and this adjustment direction is determined by the same processing as in step S26.

(Step S275)

The position is corrected according to the correction amount (adjustment direction, adjustment amount y4) determined in step S265. This processing is similar to step S27 in FIG. 3.

In the second embodiment in which Modifications 2 and 3 are applied to the first embodiment as described above, the effects of Modifications 2 and 3 can be obtained in addition to the first embodiment. Hence, it is possible to tighten the screw and fasten the two objects to be fastened while the objects are aligned with higher precision.

Other Modification

Note that while the tightening up to the final tightening is completed by one position correction in the example of FIG.

4, in reality, the position correction may be performed multiple times. Additionally, the threshold values yH and yL do not necessarily have to match the upper and lower tolerance limits, and the target range at the time of screw tightening may be narrower than the width between the upper and lower tolerance limits. As a result, the inter-member distance y comes closer to the median in the final state of final tightening, and variation at the time of adjustment becomes small.

The configuration of the screw tightening apparatus 10 having the automatic position adjustment function has been described above by referring to the main configuration to describe the features of the above embodiment. The configuration of the screw tightening apparatus 10 is not limited to the above configuration, and may be modified in various ways within the scope of claims. Additionally, the configuration included in a general screw tightening apparatus is not excluded.

Although embodiments of the present invention have been described and illustrated in detail, the disclosed embodiments are made for purposes of illustration and example only and not limitation. The scope of the present invention should be interpreted by terms of the appended claims.

What is claimed is:

1. A screw tightening apparatus that fastens, with a screw, two objects to be fastened including a first member provided with a first screw hole and a second member provided with a second screw hole for screwing, the screw tightening apparatus comprising: a distance measuring device that measures a relative position between the first member and the second member in a vertical direction perpendicular to an axial direction of the second screw hole: a screw tightening part that holds the screw inserted into the first screw hole and screws the screw into the second screw hole for screwing; a moving mechanism that moves the screw tightening part along the vertical direction, and a hardware processor that controls the screw tightening part and the moving mechanism according to a measured value of the distance measuring device, wherein the hardware processor brings the first and second members to a temporarily tightened state by screwing the screw into the second screw hole by the screw tightening part, and moves the screw tightening part holding the screw in the vertical direction by the moving mechanism to temporarily adjust the position of the second member relative to the first member to bring the position close to a median within a target range, further tightens the screw by the screw tightening part while measuring the relative position between the first member and the second member by the distance measuring device, and loosens the screw by the screw tightening part when the relative position goes out of the target range, and moves the screw tightening part by the moving mechanism by a predetermined adjustment amount in an adjustment direction determined on the basis of a measured value of the distance measuring device when the relative position goes out of the target range, and then tightens the screw again.

2. The screw tightening apparatus according to claim 1, wherein
the first screw hole is a long hole, and
the adjustment direction is the vertical direction, and is a direction opposite to the moving direction of the position that has moved out of the target range in a major axis direction of the long hole.

3. The screw tightening apparatus according to claim 1, wherein
the target range is changed according to a tightening amount of the screw.

4. The screw tightening apparatus according to claim 3, wherein the tightening amount of the screw is obtained by a rotation amount of the screw.

5. The screw tightening apparatus according to claim 1, wherein
the hardware processor determines the adjustment amount on the basis of the tightening amount of the screw and the measured value of the distance measuring device at the time of the temporary adjustment, and the tightening amount of the screw and the measured value of the distance measuring device when the relative position goes out of the target range.

6. The screw tightening apparatus according to claim 5, wherein
the hardware processor determines the adjustment amount by extrapolating using a tightening amount with which the screw is finally tightened.

7. The screw tightening apparatus according to claim 1, further comprising a final tightening detector that detects that the screw has reached a final tightening amount, wherein
the hardware processor stores the final tightening amount detected by the final tightening detector, and defines a state in which the final tightening amount is loosened by a predetermined tightening amount as the temporarily tightened state.

8. A screw tightening method of fastening, with a screw, two objects to be fastened including a first member provided with a first screw hole and a second member provided with a second screw hole for screwing, the method comprising: (a) bringing the first and second members to a temporarily tightened state by screwing the screw into the second screw hole by a screw tightening part, (b) moving the screw tightening part holding the screw in a vertical direction perpendicularto an axial direction of the second screw hole by a moving mechanism to temporarily adjust a position of the second member relative to the first member to bring the position close to a median within a target range; (c) further tightening the screw by the screw tightening part while measuring the relative position between the first member and the second member by a distance measuring device, and loosening the screw by the screw tightening part when the relative position goes out of the target range; (d) moving the screw tightening part by the moving mechanism by a predetermined adjustment amount in an adjustment direction determined on the basis of a measured value of the distance measuring device when the relative position goes out of the target range; and then after (d),(e) tightening the screw again.

9. The screw tightening method according to claim 8, wherein
the first screw hole is a long hole, and
the adjustment direction is the vertical direction, and is a direction opposite to the moving direction of the position that has moved out of the target range in a major axis direction of the long hole.

10. The screw tightening method according to claim 8, wherein
the target range is changed according to a tightening amount of the screw.

11. The screw tightening method according to claim 10, wherein
the tightening amount of the screw is obtained by a rotation amount of the screw.

12. The screw tightening method according to claim 8, wherein
- in the (d), the adjustment amount is determined on the basis of the tightening amount of the screw and the measured value of the distance measuring device at the time of the temporary adjustment, and the tightening amount of the screw and the measured value of the distance measuring device when the relative position goes out of the target range.

13. The screw tightening method according to claim 12, wherein
- in the (d), the adjustment amount is determined by extrapolating using a tightening amount with which the screw is finally tightened.

14. The screw tightening method according to claim 8 further comprising (f) detecting that the screw has reached a final tightening amount, wherein
- in the (a), the final tightening amount detected in the (f) is stored, a state in which the final tightening amount is loosened by a predetermined tightening amount is defined as the temporarily tightened state.

\* \* \* \* \*